United States Patent
Faulstich

[11] Patent Number: 5,890,950
[45] Date of Patent: Apr. 6, 1999

[54] METHOD FOR SHAVING OR SHAVE GRINDING CYLINDRICAL GEAR WHEELS, ESPECIALLY FLANK-LINE MODIFIED GEAR WHEELS, AND FOR PROFILING THE TOOLS REQUIRED FOR SHAVE GRINDING CYLINDRICAL GEAR WHEELS

[75] Inventor: Ingo Faulstich, Ludwigsburg, Germany

[73] Assignee: Hermann Pfauter GmbH & Co., Ludwigsburg, Germany

[21] Appl. No.: 975,882

[22] Filed: Nov. 21, 1997

Related U.S. Application Data

[63] Continuation of Ser. No. 698,280, Aug. 15, 1996, abandoned.

[30] Foreign Application Priority Data

Aug. 17, 1995 [DE] Germany .................. 195 30 227.3

[51] Int. Cl.⁶ .................................................. B24B 1/00
[52] U.S. Cl. .......................... 451/47; 451/219; 409/33; 409/37; 409/49
[58] Field of Search .................. 457/47, 219; 409/33, 409/34, 32, 37, 46, 49

[56] References Cited

U.S. PATENT DOCUMENTS

| | | | |
|---|---|---|---|
| 2,547,517 | 4/1951 | Austin | 409/33 |
| 2,864,282 | 12/1958 | Daniel | 409/32 |
| 3,504,565 | 4/1970 | Lichtenauer et al. | 409/37 |
| 4,077,164 | 3/1978 | Peterman | 51/206 P |
| 4,212,572 | 7/1980 | Vu-Do | 451/114 |
| 4,545,708 | 10/1985 | Buschhoff et al. | 451/147 |
| 4,575,289 | 3/1986 | Fischer et al. | 409/33 |
| 4,649,671 | 3/1987 | Erhardt et al. | 451/47 |
| 4,848,040 | 7/1989 | Nishimo | 451/47 |
| 4,872,791 | 10/1989 | Crankshaw | 409/32 |
| 4,947,590 | 8/1990 | Schapp et al. | 409/33 |
| 5,092,720 | 3/1992 | Abysov et al. | 451/47 |
| 5,377,457 | 1/1995 | Loos et al. | 451/47 |
| 5,395,189 | 3/1995 | Schriefer . | |

FOREIGN PATENT DOCUMENTS

| | | | |
|---|---|---|---|
| 3142843A | 5/1983 | Germany | B23F 19/00 |
| 3823560C | 4/1989 | Germany | B23F 19/00 |
| 4214851A | 11/1993 | Germany | B23F 19/00 |
| 655672 | 8/1951 | United Kingdom . | |

*Primary Examiner*—Robert A. Rose
*Assistant Examiner*—George Nguyen
*Attorney, Agent, or Firm*—Leydig, Voit & Mayer, Ltd.

[57] ABSTRACT

A method for shaving and shave grinding tooth flanks of cylindrical workpiece gear wheels, especially, flank-line modified gear wheels, and for profiling tools needed for shave-grinding cylindrical workpiece gear wheels. During the machining of gear wheels, certain areas of the gear wheel need to be machined more so than other areas, meaning that some areas require more material to be removed than other areas. As a result, certain areas of the tool are not uniformly worn, but rather the area of the tool which removes the most material is worn more quickly than other areas of the tool. Similarly, if certain areas of the gear wheel are harder than other areas, the tool performing the actual machining will wear at a corresponding rate. The present invention avoids such non-uniform wear by providing greater areas of cutting surface on the tool performing the actual machining in the positions which are required to remove the most material, or which are required to machine the hardest surfaces of the workpiece.

8 Claims, 4 Drawing Sheets

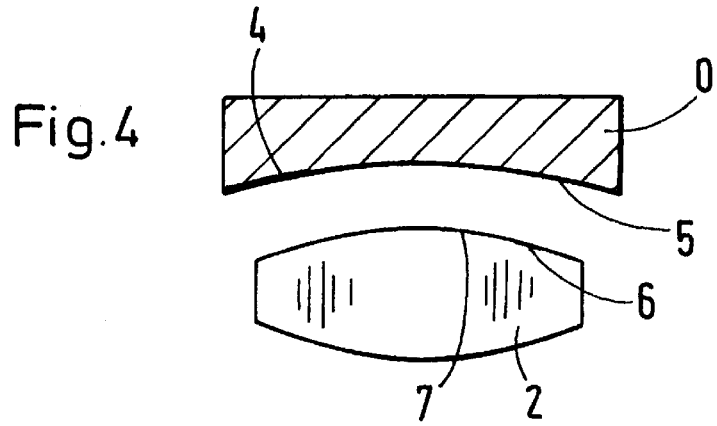
Fig. 4
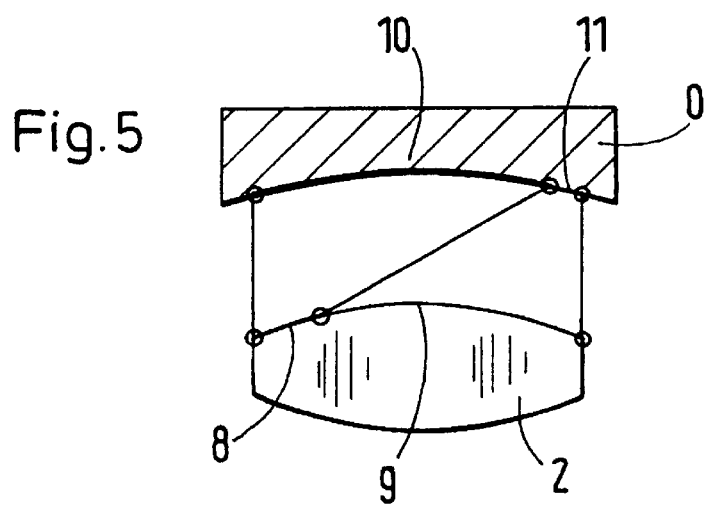
Fig. 5
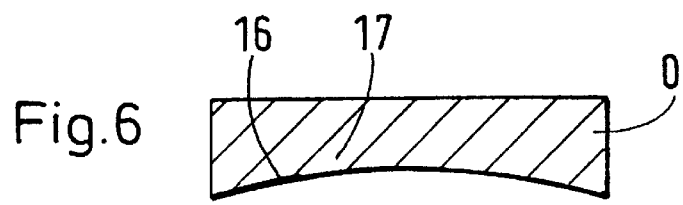
Fig. 6
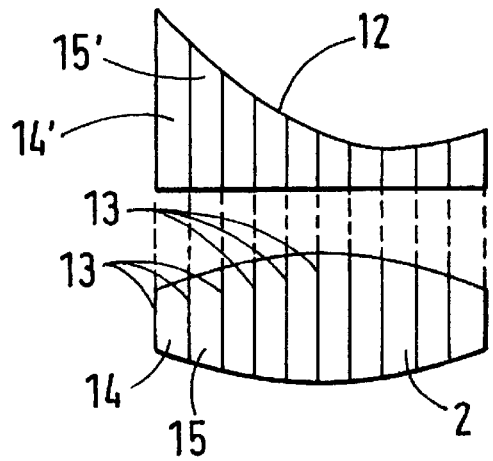

1

METHOD FOR SHAVING OR SHAVE GRINDING CYLINDRICAL GEAR WHEELS, ESPECIALLY FLANK-LINE MODIFIED GEAR WHEELS, AND FOR PROFILING THE TOOLS REQUIRED FOR SHAVE GRINDING CYLINDRICAL GEAR WHEELS

This is a continuation of application(s) Ser. No. 08/698,280 filed on Aug. 15, 1996, abandoned.

FIELD OF THE INVENTION

Invention relates to a process for the shaving or shave-grinding tooth flanks of cylindrical, gear wheels especially flank-line modified gear wheels, and for profiling the tools required for shave-grinding.

In the shaving or shave-grinding of cylindrical gear wheels, especially flank-line modified gear wheels, the gear wheels are processed with inside-toothed or outside-toothed tools. During the processing of the work-piece gear wheels, the tools and the workpiece gear wheels are rotated about their respective axes. They are set for a certain axial spacing and a certain crossing angle. During processing, portions the workpiece gear wheel are moved past the part-body of the tool gear wheel in such a manner that the active zones of the workpiece gear wheel, and possibly of the tool gear wheel, are successively completely enveloped. Here it plays no role whether the workpiece gear wheel, the tool gear wheel, or both gear wheels, execute a part of this relative movement. Besides the reciprocal envelopment of the part-bodies 0 1 and 2 over the corresponding widths, it is to be ensured that in each contact point, the tangents present in the tool gear wheel, and the flank lines required on the workpiece gear wheel, have the same direction. This additional requirement can be fulfilled approximately by corresponding correction movements during the processing. In the process described herein there arises the problem that the geometric deviations present after the preliminary processing of the workpiece gear wheels are not sufficiently reduced, and the workpieces, therefore, have a poor denticulation quality.

In other instances of use, problems arise though the fact that the spatial relations allow only a severely restricted oscillation stroke (shoulder work). For processing in such situations quantitatively small axial cross angles are required; this means unfavorable working conditions, poor removal of material, and poor denticulation quality.

Underlying the present invention is the problem of developing a process of shaving or shave-grinding gear wheels in such a manner that there are yielded more favorable conditions than heretofore have been possible with respect to denticulation quality.

SUMMARY OF THE INVENTION

This problem is solved according to the invention with a process of shaving or shave-grinding gear wheels, especially flank-line modified gear wheels, or profiling tools needed for shave-grinding gear wheels, wherein certain portions of the work piece gear wheels are specifically allocated for processing by specific portions of the tool gear wheel, and wherein the portions of the work piece gear wheel which are expected to be heavily worn are allocated to a larger portion of the tool gear. With the process of the present invention, certain width ranges of the workpiece gear wheel and of the trueing wheel defined by face cuts, are precisely allocated certain width ranges of the tool gear wheel which are also defined by face cuts. As a result of this precise adaptation, the process can be developed in such a way that in the places in which great material removal is desired on the workpiece gear wheel, correspondingly greater amounts of cutting material are made available than with prior art methods. The wear on the tool gear wheel is thereby distributed approximately uniformly over the tool width, and the maximal wear is kept small. The tool costs; remain low. Furthermore, a high denticulation quality is achieved.

With the process of the present invention it is also possible, virtually without movement of the axial slide with which the workpiece gear wheel is shifted in the direction of its axis of rotation, to allow the contact point between workpiece and tool gear wheel to wander over the entire width of the workpiece gear wheel. The allocation sought regarding the face cuts is iteratively determined. For each of the face cut pairs, the required displacements of the support points are drawn up for the determination of the path to be executed by the machine and utilized for initializing the machine program. Depending on the face cuts active on the tool gear wheel, a meaningful tool width can be established.

Further features of the invention are yielded from the following claims, the specification and the drawings.

BRIEF DESCRIPTION OF THE DRAWINGS

The invention is explained in detail with the aid of the embodiments of the present invention represented in the drawings, wherein:

FIG. 4 shows the allocation of the active zones of the tool to those of the workpiece to be processed, or the allocation of the active zones of the tool to those of the truing wheel according to the prior art, FIG. 5 shows in simplified representation, the allocation of the active zones of the tool to those of the workpiece in execution of the process according to the invention, and FIG. 6 shows a sketch to explain the quantitative allocation of the active zones of the tool to those of the work piece, in execution of the process of the invention.

DETAILED DESCRIPTION OF THE INVENTION

The process described herein is directed to the shaving or shave-grinding of cylindrical, especially flank-line modified gear wheels. This process can also provide profiled tools needed for the shave-grinding. These processes can be carried out with inside-toothed or outside-toothed tools.

Figure 1A:
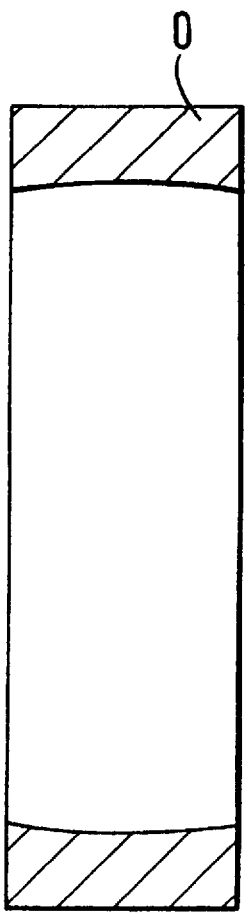
FIG. 1a shows the part-body of a grinding ring which is constructed concave from within.
Figure 1B:
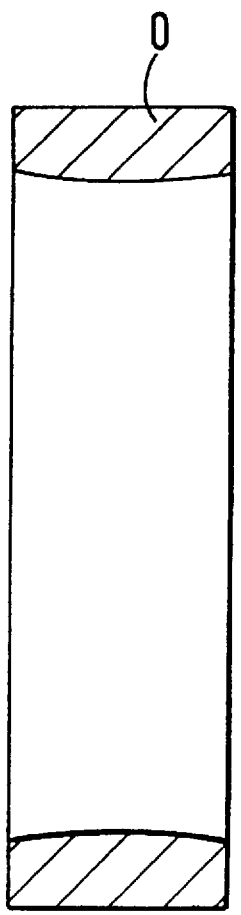
FIG. 1b shows the part-body of a grinding ring which is constructed convex from within.
Figure 1E:
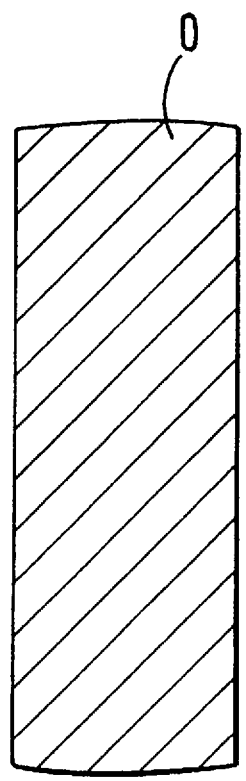
FIG. 1e shows the part-body of an outside-toothed tool.
Figure 1C:
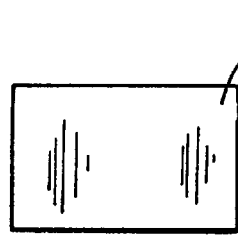
FIG. 1c shows the part-body of a workpiece truing wheel without flank-line modification.
Figure 1D:
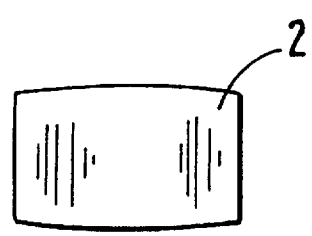
FIG. 1d shows the part-body of a workpiece or of a truing wheel with a flank line modification in the form of a camber.

FIGS. 1a to 1d show, with the aid of examples, part-bodies of grinding rings 0 (FIGS. 1a and 1b) which are constructed concave from inside (FIG. 1a), or convex from inside (FIG. 1b). With inside-toothed grinding rings 0, workpieces 1 and 2 are processed (FIGS. 1c and 1d).

Instead of an inside-toothed grinding ring an out-side-toothed tool 0 (shaving or shave-grinding wheel) can also be used, as FIG. 1e shows.

The part-bodies 1 and 2 may also belong to truing wheels with which the tools 0 are profiled, insofar as the tools are truable. In the following, description however, it is assumed that the part-bodies 1 and 2 correspond to workpieces.

During the processing of the workpieces, tool 0 and workpiece 1 or 2 are rotated about their respective axes. These axes are adjusted to a certain axial spacing and a certain crossing angle. Workpiece 1 and 2, during the processing, and is moved past the part-body of the tool 0 in such a manner that the active zones of tool 0 and of the workpiece 1 or 2 are successively completely enveloped. In this manner the workpiece 1 or 2 is completely processed over its width. The movements required for this are executed automatically by a corresponding control of the machine.

In order to understand the process to be described in the following description, it is helpful to examine a greatly simplified model. Instead of the toothed elements tool 0, workpiece 1 or 2, or the truing wheel, this model contains exclusively the part-bodies of these elements as they are to be perceived in FIGS. 1a to 1e, in a level representation. The flank line modifications present on the workpiece or truing wheel in the form of a width-roundedness are converted to the axial section and represented greatly enlarged. Further, it is supposed in the model that the part-bodies of workpiece or truing wheel, and ring, touch in the axial section plane of the workpiece or truing wheel. The adaptation of the swinging angle possibly provided in conventional processes to the direction of the flank lines of tool 0 and workpiece 1 or 2 at the contact point is not required for the understanding of the proposed process and, for this reason, not taken into consideration in the sketch. For the same reason, the rotation of the tool or workpiece about its respective axis of rotation is also not considered during processing, for example, the barrel-shaped part-body of the workpiece 2 according to FIG. 1d is moved past the part-body of the grinding ring, which can be constructed in correspondence to FIGS. 1a, 1b or 1e, in such manner that the contact point between workpiece 2 and tool 0 wanders over virtually the entire width over the workpiece 2 and possibly also of the tool 0. Thus, the workpiece 2 is processed over its entire width. Ordinarily, the workpiece 2 executes, superposed on the feed movement of the tool (arrow 3 in FIG. 2), an oscillating movement. This has a substantial movement component in the axial direction of the workpiece 2. The stretches that are to be active in the axial direction of the tool 0 and of the barrel-shaped part-body 2, are taken into consideration in the processing program (Numeral Control, NC, program of the machine.

Aside from the zones in the vicinity of the switch-over points at which the oscillation movement is reversed, the bodies move at a constant, or at least approximently constant, relative velocity. Therefore at a fixed feed rate for the processing of a certain range on the workpiece 2, a permanently allocated range on the tool 0 is made available.

Now, over the width of the workpiece, there is not an equal amount of material to be removed in all places, because, for example, certain modifications are to be generated. Above all, however, this is because the workpieces to be processed under some circumstances have great flank-line deviations. It has been proven that in series production, certain deviations occur systematically, for example, in workpieces which are to be processed after hardening. It is possible, therefore, to use specific steps to the workpiece quality.

In prior art processes, this is accomplished by means that, for example, increase the number of strokes, or by performing the denticulation deviations to be expected are performed by corresponding manipulation of the part-body (reserve). These processes, however, have the disadvantage that the tool is rapidly worn down in certain places and, consequently, the denticulation quality of the successively processed workpieces rapidly declines.

In the present process, a new approach is proposed. The problem can thereby be mastered surprisingly simply. The process proceeds from the insight that in the places in which more material must be removed than in others, also more cutting material should be made available on the tool 0.

However, the wish to have more cutting material at certain places of the processing must not result in great offset over the workpiece width. For example, it is known that many workpieces must be finely worked that still have, on one or both face sides, a burr, (primary/secondary burr) or merely near the face surfaces have a greater hardness than in the other range of the flanks. These parts can, to be sure, often be processed geometrically satisfactorily with the conventional processes, but locally there occurs a very high wear on the tool and, consequently a poor denticulation quality.

With the new process, regardless of the cause of tool wear, for example by reason of test processings, the places of the workpiece wherein more cutting material must be made available are established. A manipulation of the part-body or workpiece, therefore, is no longer required, although such a measure can also be performed parallel to the proposed process. The differences in this regard between the traditional process and the new process are best explained in detail with the aid of FIGS. 4 to 6. With the conventional process (FIG. 4), the situation arises wherein for each large stretch element 4 of the active surface 5 of the tool 0, equally large stretch elements 6 of the active zone 7 of the workpiece 2 are provided. During rotation of the part-bodies, the stretches on the tool result in corresponding working surfaces on the cutting material. This holds true not only for the simplified model, but in principle also for the toothed tool actually used.

In the new process, for the zones in which more material is to be removed on the workpiece 2, correspondingly more cutting material is made available on the tool. Thus, in FIG. 5 to the surfaces 8 and 9 there are allocated the corresponding surfaces 10 and 11, respectively, of the tool 0. Since in the zone 8 of the workpiece 2, for example, more material must be removed than in the zone 9, in the zone 10 of the workpiece 0 obviously more cutting material is available than in the zone 11.

The specific procedure of the present invention is now explained in detail with the aid of FIG. 6. The process can be most clearly described with respect to the situation wherein different amounts of material are to be removed over the width of the workpiece 2. This material removal over the width of the workpiece 2 is characterized by the curve 12. Over the width of the workpiece face, cuts are laid which have equal spacing from one another and, consequently establish equally great width ranges. In FIG. 6, a number of face cuts 13 are indicated. Two adjacent face cuts bound a surface element 14 of the workpiece part-body or a surface element 14' in the middle part of the diagram presented in FIG. 6. The mean height of the element 14' is selected proportionally to the material volume to be removed in this range. In this manner the ordinate values of all the surface elements are determined and thereupon added. This sum corresponds to the total volume of the material to be removed on the workpiece 2. It is assumed in this example, that the sum of the ordinates yields the value 113. Further, it is assumed that the tool 0 has an active width of 60 mm. This width of 60 mm is now subdivided into 113 increments. It is also assumed in this example, that to the surface element 14 there is assigned an ordinate value of 24, and to the surface element 15, an ordinate value of 19. Correspondingly, in the active zone of the tool 0 there is allocated to the surface element 14 of the workpiece the surface element 16, the width 24 of which corresponds to 24 increments of the active tool width. To the surface element 15 of the workpiece there is allocated the surface element 17 on the tool, the width of which correspondingly is equal to 19 increments of the active tool width. This process is carried out for all the surface elements. Since on surface element 14 more material is to be removed, more cutting material is available in the active range in the surface zone 16 than in the tool zone 17, with which the surface element 15 is to be processed. By reason of this allocation of the face cuts of tool and workpiece, there are yielded clear paths of movement which the workpiece has to execute relative to the tool.

In the described example of execution, it is assumed that different material volumes are to be removed per element of the workpiece width. The process, however, is not restricted to such a situation. More cutting material on the tool can also be made available in certain zones in the situation wherein on the workpiece, for example on the face side, a higher hardness is present than in the middle range. Therefore, for the processing of the harder zone on the tool, correspondingly greater amounts of cutting material is desirable. Any number of reasons can call for making available different amounts of cutting material for certain workpiece sections.

The proposed process is applicable also in processes which are ordinarily described as processes with linear contact. In these processes, by reason of the flank-line deviations present at the beginning of processing point contact is initially present which can be approached with the described means.

The described process can be further developed to the effect that with suitable sensors, which are known per se, processing data can be obtained about the desired or required cutting material distribution in the active zone of the tool. This data can be connected after the processing of a test piece, into corresponding paths of movement. It is also possible, however to evaluate such information dynamically, in order to calculate a new path, and during the actual processing, to switch over onto the new path. This can occur, for example, at the end of an oscillation stroke.

Instead of the workpiece 1 or 2 there can also be used a truing wheel 1 or 2, with which the tool 0 is profiled. The process is especially applicable during the first profiling tool 0, or in a possibly necessary reprofiling of the tool 0.

The described processing method is usable not only with use of truable tools 0, but also with the the use of non-truable tools.

Figure 2:
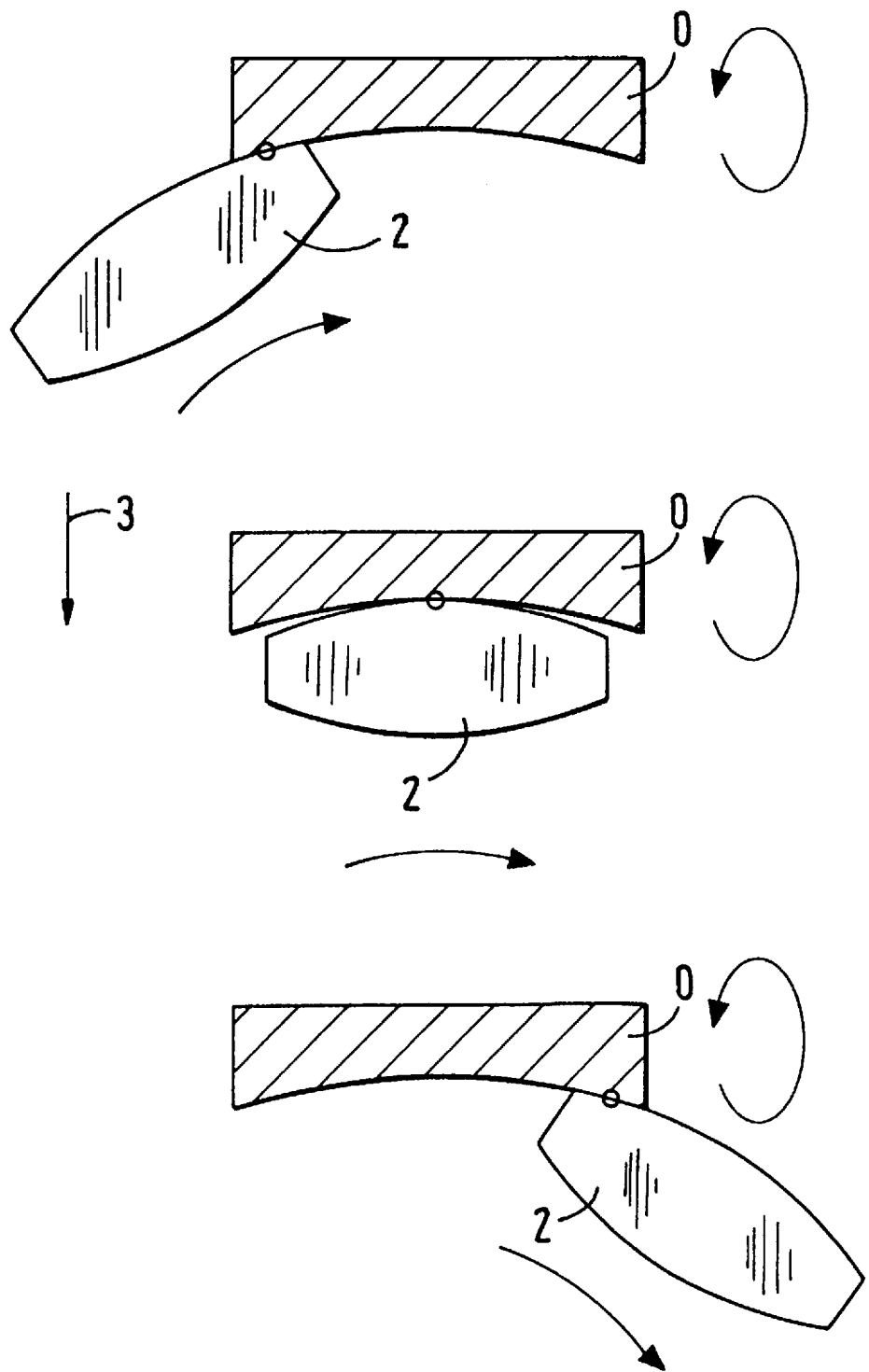
FIG. 2 shows three different positions of the workpiece or truing wheel relative to the tool during the processing of the workpiece by the tool or during the profiling of the tool by a truing wheel.

In FIG. 2 the right part of the workpiece 2 is processed by the left part of the tool 0, and the left part of the workpiece 2 is processed by the right part of the tool 0. In contrast to this, in FIG. 3 the left part of the workpiece 2 is processed by the left part of the tool 0 and, correspondingly, the right part of the workpiece 2 is processed by the right part of the tool 0.

Figure 3:
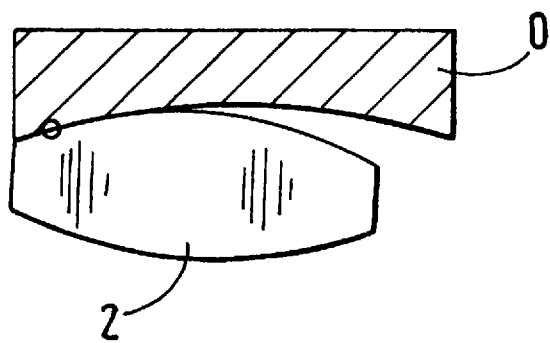
FIG. 3 shows a schematic representation of an execution of the process according to FIG. 2 with altered face cut allocation.
Figure 3:
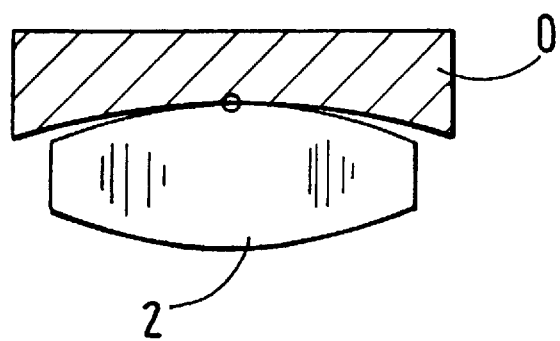
Figure 3:
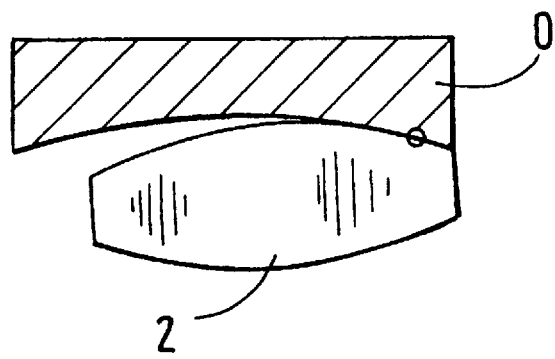

A comparison of FIGS. 2 and 3 shows that it is obviously possible to choose face-section allocations in which the contact point between tool 0 and workpiece 2 wanders over the entire workpiece width and possibly over the entire tool width. Thus ensures a processing of the workpiece over the full width, in which the same "cutting material amount" is used for the processing, but in which considerably different paths are necessary in the direction of the workpiece axis.

In the described process for the shaving or shave-grinding of the tooth flanks of cylindrical, gear wheels in particular flank-line modified gear wheels, or for the profiling of the tools needed for the shave-grinding, there are used for the processing of the work-piece, gear-wheels shaped tools with a defined cutting edge (shaving wheel) or with an undefined cutting edge (shave-grinding wheel, outside-toothed or inside-toothed) furthermore for the profiling of the tool gear wheels needed for the shave-grinding, there are used gear-wheel form truing wheels. Tool gear wheels and workpiece gear wheels roll in flank contact with one another, in which the axes of tool gear wheel and workpiece gear wheel are set in the starting position for a certain axial spacing and a certain axial crossing angle. Between the workpiece gear wheel and the tool gear wheel there are executed relative movements such that the tool gear wheel flanks successively completely envelop the workpiece gear wheel flanks. In the manner described, herein, for certain width ranges of the workpiece or truing wheel gear wheel flanks defined by face cuts there are specifically allocated width ranges of the tool gear wheel flanks similarly defined by face cuts. This allocation occurs in the sense that for zones of the workpiece gear wheel flanks in which increased tool wear is to be expected in their processing, a greater share in processing surface of the tool gear wheel flanks is provided than for the other zones.

In the event that there is no displacement in the direction of the workpiece axis, the proposed process resembles dipping. There are, however, substantial differences between the two processes. In dipping, linear contact is present; in the proposed process, approximate point contact is present. In the proposed process, there normally occur higher surface pressings, and correspondingly a more favorable removal behavior. Further, there exists the possibility of executing faultlessly with the new process the flank line modification arising on the workpiece with use of an incorrect truing wheel for the dipping process and, therefore, of clearly improving the denticulation quality of the processed workpieces. Finally, it is important to note that with use of the new process better workpiece surfaces result than in the case of dipping because, for example, with dipping a single protruding grain on the tool operates virtually in all gaps in the dipping process (therefore on all left flanks or all right flanks of the workpiece) with the new process, on the other hand by reason of the over-rolling numbers of tool and workpiece, contact is made only in a few tooth gaps.

The process explained herein can also be driven with a low oscillation stroke. The further the collision-endangered place is to be approached, the smaller the amount of swinging angle chosen must be.

By way of a specific allocation of face cuts to workpiece and tool, it is even possible, virtually without movement of the axial slide piece (slide piece for the shifting of the workpiece in the direction of its axis of rotation), to allow the contact point to wander over the entire width of the workpiece.

In the determination of the paths required for this there is followed, for example, the following procedure: Over the width of the part-body 2 there are established a number of face cuts. These face cuts may, but do not have to, have the same spacing. As a result, the same number of face cuts, similarly distributed over the width of the part-body 0, are established and the face cuts 2 are allocated to the face cuts 0 in such manner that, for example, the first (second, third, fourth . . .) face cut on the left side of the workpiece 2 in each case forms a pair with the first (second, third fourth. . .) face cut of the tool, and likewise on the left side of the tool 0. Then for each of these pairs it is calculated what movements are required in the direction of the axes in order to determine the correct contact point. If an undesirably great displacement is necessary in the direction of the workpiece axis, for example, on the part-body 0 there is established an axially slightly displaced face cut and the calculation is repeated. In this manner, it is possible iteratively to determine the allocation sought of the face cuts for each of the face cut pairs. For each of the face cut pairs the required shifts of the support points are then drawn upon for the determination of the path to be executed by the machine, and used in a known manner for setting-up the NC program. Finally, based on the face cuts active on the tool, it is possible to establish a purposeful tool width.

The process described above serves likewise for the shaving or shave-grinding of the tooth flanks of cylindrical, gear wheels especially of flank-line modified gear wheels, or for the profiling of the tools needed for the shave-grinding. For the processing of workpiece gear wheels, gear wheel shaped tools are used with defined cutting edges (shave wheel) or with undefined cutting edges (shave-grinding wheel, outside- or inside toothed). For the profiling of the tool gear wheels required for the shave-grinding, truing wheels of gear-wheel shape are used. The tool gear wheel and workpiece gear wheel roll in flank contact with one another. The axes of tool gear wheel and workpiece gear wheel are set in the starting position at a certain axial spacing and a certain axial crossing angle. Between the workpiece gear wheel and the tool gear wheel there are executed relative movements such that the tool gear wheel flanks successively completely envelop the workpiece gear wheel flanks. In the described process, there is used a tool gear wheel which has the same or a slightly less effective width roundedness than demanded on the workpiece gear wheel, or a truing wheel which has the same or a greater width roundedness than the inside-toothed tool gear wheel (grinding ring) demands. The allocation of the width ranges of tool gear wheel and workpiece gear wheel or truing wheel and inside-toothed workpiece gear wheel (grinding ring) is made in such a way that for several face cuts of the workpiece gear wheel, or of the truing wheel, there are iteratively determined face cuts of the tool gear wheel or of the inside-toothed tool gear wheel (grinding ring). This is done in such manner that the displacement required in the direction of the axis of the workpiece gear wheel, or of the truing wheel, is virtually zero, or has the desired value. The values determined for the processing of the individual face cuts of the tool gear wheel, or for the truing of the individual face cuts of the truing wheel, are used as support points for setting-up the machine control program. In this manner, the width ranges of workpiece gear wheel and truing wheel, respectively, and tool gear wheel are precisily allocated to one another, and the width of the tool gear wheel or truing wheel is established based on the calculation of the active width of the tool gear wheel and of the truing wheel, respectively.

I claim:

1. A method for shave-grinding tooth flanks of cylindrical workpiece gear wheels, wherein gear-shaped tools are used for the shave-grinding, and wherein the tool gear wheels and workpiece gear wheels rotate in flank contact with each other, the tool gear wheel rotating about an axis orthogonal to the axis of rotation of the workpiece gear wheel, the method comprising the steps of:

moving the workpiece gear wheel across to the tool gear wheel as the tool gear wheel rotated such that the entire width of the tool gear wheel engages the entire width of the workpiece gear wheel; and precisely allocating certain width ranges of the tool gear wheel flanks to perform the shave-grinding of certain width ranges of the workpiece gear wheel, larger portions of the tool gear wheel being allocated in areas of the workpiece gear wheel in which increased wear is expected.

2. The method of claim 1 further including the step of evaluating process magnitudes to determine the width ranges of the workpiece gear wheel and the tool gear wheel.

3. The method of claim 2 further including the steps of performing the evaluating step during the shave-grinding, and altering the moving step based on the evaluating step.

4. The method of claim 1, further including the step of evaluating process magnitudes to determine the width ranges of the dressing wheel and the tool gear wheel.

5. The method of claim 2 further including the steps of performing the evaluating step during the profiling, and altering the moving step based on the evaluating step.

6. A method for shave-grinding tooth flanks of cylindrical workpiece gear wheels, wherein gear-shaped tools are used for the shave-grinding, and wherein the tool gear wheels and workpiece gear wheels rotate in flank contact with each other, the tool gear wheel rotating about an axis orthogonal to the axis of rotation of the workpiece gear wheel, the method comprising the steps of:

moving the workpiece gear wheel across the tool gear wheel as the tool gear wheel rotates such that the entire width of the tool gear wheel engages the entire width of the workpiece gear wheel, wherein the tool gear wheels have a width no greater than the width of the workpiece gear wheels; and precisely allocating certain width ranges of the tool gear wheel to perform the shave-grinding of certain width ranges of the workpiece gear wheel, the allocation being made such that for several face cuts of the workpiece gear wheel, face cuts of the tool gear wheel are determined iteratively, whereby the displacement required of the workpiece gear wheel has a desired value and the desired values determined are used to set up a machine control program so that width ranges of the workpiece gear wheel and tool gear wheel are precisely allocated to one another.

7. A method for profiling tool gear wheels needed for shave-grinding cylindrical workpiece gear wheels, wherein gear-shaped dressing wheels are used for the profiling, and wherein the tool gear wheels and dressing wheels rotate in flank contact with each other, the tool gear wheel rotating about an axis orthogonal to the axis of rotation of the dressing wheel, the method comprising the steps of:

moving the dressing wheel across the tool gear wheel as the tool gear wheel rotates such that the entire width of the tool gear wheel engages the entire width of the dressing wheel; and precisely allocating certain width ranges of the dressing wheel to perform the profiling on certain width ranges of the tool gear wheel, larger portions of the dressing wheel being allocated in areas of the tool gear wheel in which increased wear is expected.

8. A method for profiling tool gear wheels needed for shave-grinding cylindrical workpiece gear wheels, wherein gear-shaped dressing wheels are used for the profiling, and wherein the tool gear wheels and dressing wheels rotate in flank contact with each other, the tool gear wheel rotating about an axis orthogonal to the axis of rotation of the dressing wheel, the method comprising the steps of:

moving the dressing wheel across the tool gear wheel as the tool gear wheel rotates such that the entire width of the tool gear wheel engages the entire width of the dressing wheel, wherein the tool gear wheels have a width no greater than the width of the dressing wheels; and precisely allocating certain width ranges of the dressing wheels to perform the profiling on certain width ranges of the tool gear wheels, the allocation being made such that for several face cuts of the dressing wheel, face cuts of the tool gear wheel are determined iteratively, whereby the displacement required of the dressing wheel has a desired value and the desired value determined are used to set up a machine control program so that width ranges of the dressing wheel and tool gear wheel are precisely allocated to one another.

* * * * *